US012143824B2

(12) United States Patent
Goto

(10) Patent No.: US 12,143,824 B2
(45) Date of Patent: Nov. 12, 2024

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Fumihide Goto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/964,105

(22) Filed: Oct. 12, 2022

(65) Prior Publication Data
US 2023/0030588 A1 Feb. 2, 2023

Related U.S. Application Data

(63) Continuation of application No. 16/445,689, filed on Jun. 19, 2019, now Pat. No. 11,553,349, which is a
(Continued)

(30) Foreign Application Priority Data

Dec. 26, 2016 (JP) .................................. 2016-251925

(51) Int. Cl.
H04W 12/06 (2021.01)
H04W 4/00 (2018.01)
(Continued)

(52) U.S. Cl.
CPC ............. *H04W 12/50* (2021.01); *H04W 4/00* (2013.01); *H04W 8/00* (2013.01); *H04W 8/22* (2013.01);
(Continued)

(58) Field of Classification Search
CPC ....... H04W 4/80; H04W 12/08; H04W 12/50; H04W 12/06; H04W 84/12;
(Continued)

(56) References Cited

U.S. PATENT DOCUMENTS 9,496,927 B1 11/2016 Grinberg et al.
9,723,550 B2 8/2017 Sato
(Continued)

FOREIGN PATENT DOCUMENTS

CN 104640058 A 5/2015
CN 105557021 A 5/2016
(Continued)

OTHER PUBLICATIONS

PCT International Search Report and Written Opinion dated Feb. 27, 2018, in PCT/JP2017/041810.
(Continued)

*Primary Examiner* — Quan M Hua
(74) *Attorney, Agent, or Firm* — VENABLE LLP

(57) ABSTRACT

A communication apparatus performs short range wireless communication, performs a second communication different from the short range wireless communication, detects, by using the short range wireless communication, a partner apparatus with which sharing processing for sharing a communication parameter used for joining a network is to be performed, and obtains, from the partner apparatus detected, a public key by using the second communication. Authentication processing with the partner apparatus is executed by using the public key obtained, and in a case where the authentication processing succeeds, the sharing processing with the partner apparatus is executed.

11 Claims, 11 Drawing Sheets

Related U.S. Application Data continuation of application No. PCT/JP2017/041810, filed on Nov. 21, 2017.

(51) Int. Cl.

| | |
|---|---|
| *H04W 8/00* | (2009.01) |
| *H04W 8/22* | (2009.01) |
| *H04W 12/041* | (2021.01) |
| *H04W 12/0471* | (2021.01) |
| *H04W 12/50* | (2021.01) |
| *H04W 76/10* | (2018.01) |
| *H04W 84/10* | (2009.01) |
| *H04W 88/06* | (2009.01) |
| *H04W 12/04* | (2021.01) |
| *H04W 36/14* | (2009.01) |
| *H04W 84/12* | (2009.01) |

(52) U.S. Cl.
CPC ..... *H04W 12/041* (2021.01); *H04W 12/0471* (2021.01); *H04W 12/06* (2013.01); *H04W 76/10* (2018.02); *H04W 84/10* (2013.01); *H04W 88/06* (2013.01); *H04W 12/04* (2013.01); *H04W 36/1446* (2023.05); *H04W 84/12* (2013.01)

(58) Field of Classification Search
CPC ..... H04W 12/068; H04W 12/63; H04W 4/02; H04W 12/082; H04W 12/30; H04W 12/04; H04W 12/069; H04W 12/77; H04W 4/50; H04W 12/02; H04W 12/03; H04W 12/0471; H04W 12/35; H04W 12/47; H04W 4/14; H04L 9/0861; H04L 9/3242; H04L 63/0838; H04L 9/0863; H04L 63/0407; H04L 63/0435; H04L 63/06
See application file for complete search history.

(56) References Cited

U.S. PATENT DOCUMENTS

| | | |
|---|---|---|
| 9,807,584 B2 | 10/2017 | Minakawa |
| 9,843,444 B2 | 12/2017 | Goto |
| 9,974,012 B2 | 5/2018 | Sato |
| 9,979,792 B2 | 5/2018 | Goto |
| 11,553,349 B2 * | 1/2023 | Goto ........................ H04W 8/22 |
| 2003/0007641 A1 | 1/2003 | Kinoshita |
| 2004/0242230 A1 | 12/2004 | Rue |
| 2007/0249386 A1 | 10/2007 | Bennett |
| 2009/0180425 A1 * | 7/2009 | Watanabe ............. H04W 84/18 370/328 |
| 2013/0309971 A1 * | 11/2013 | Kiukkonen ........... H04W 12/50 455/41.2 |
| 2014/0006510 A1 | 1/2014 | Hamilton et al. |
| 2014/0273844 A1 | 9/2014 | Castillo et al. |
| 2014/0273845 A1 * | 9/2014 | Russell ................. H04W 76/14 455/41.2 |
| 2014/0279479 A1 | 9/2014 | Maniar et al. |
| 2014/0376721 A1 * | 12/2014 | Perez .................... H04W 12/04 380/270 |
| 2015/0072618 A1 | 3/2015 | Granbery |
| 2015/0106533 A1 | 4/2015 | Goto |
| 2015/0131642 A1 | 5/2015 | Amano |
| 2016/0242124 A1 | 8/2016 | Zhou et al. |
| 2016/0277370 A1 | 9/2016 | Lee et al. |
| 2016/0342774 A1 * | 11/2016 | Henkel-Wallace ..... G06F 21/10 |
| 2016/0360407 A1 | 12/2016 | Benoit et al. |
| 2017/0026174 A1 * | 1/2017 | Pang .................... H04W 12/50 |
| 2017/0295448 A1 * | 10/2017 | McCann ............... H04W 12/04 |
| 2018/0241826 A1 | 8/2018 | Goto |
| 2019/0306698 A1 | 10/2019 | Goto |

FOREIGN PATENT DOCUMENTS

| | | |
|---|---|---|
| EP | 2958092 A1 | 12/2015 |
| EP | 3562256 A1 | 10/2019 |
| IN | 1655555 | 8/2005 |
| JP | 2003-018148 A | 1/2003 |
| JP | 2011-172278 A | 9/2011 |
| JP | 2014-033282 A | 2/2014 |
| JP | 2015-220604 A | 12/2016 |
| JP | 2016-219997 A | 12/2016 |
| JP | 2017028456 A * | 2/2017 |
| WO | 2013205243 A1 | 12/2014 |

OTHER PUBLICATIONS

Wi-Fi Device Provisioning Protocol (DPP) Technical Specification Version 0.0.23, 2016 Wi-Fi Alliance.
European Search Report dated May 20, 2020, in related European Patent Application No. 17887892.2.
Korean Office Action dated Sep. 21, 2020, in related Korean Patent Application No. 10-2019-7020819.
European Search Report dated Apr. 1, 2021, in related European Patent Application No. 17887892.2.
Jinlong et al., (A Hybrid Transmission System Based on NFCEnabled Mobile Phones)—Journey of Software—(Year: 2013).
Chinese Office Action dated Oct. 19, 2022, in related Chinese Patent Application No. 201780080393.3 (with English translation).

* cited by examiner

COMMUNICATION APPARATUS, CONTROL METHOD, AND COMPUTER-READABLE STORAGE MEDIUM

CROSS-REFERENCE TO RELATED APPLICATIONS

This application is a continuation of application Ser. No. 16/445,689, filed Jun. 19, 2019, which is a continuation of International Patent Application No. PCT/JP2017/041810, filed Nov. 21, 2017.

BACKGROUND OF THE INVENTION

Field of the Invention

The present invention relates to a communication apparatus, a control method, and a computer-readable storage medium, and more specifically to a connection setting technique.

Background Art

In recent years, a communication function by a wireless LAN (Local Area Network) is installed in various kinds of apparatuses ranging from a PC (Personal Computer), a mobile phone, a digital camera, a printer, and the like. When apparatuses that have a communication function by the wireless LAN are to be indirectly connected via a wireless LAN access point (AP) or directly connected by bypassing the AP, wireless LAN parameters need to be set.

However, wireless LAN parameter settings are generally complicated, and it may not always be easy for the user of a digital camera or a printer to make such settings. As a method of facilitating such parameter settings, Wi-Fi® has started to plan the Wi-Fi Device Provisioning Protocol (to be referred to as "DPP" hereinafter) (see NPL 1). Note that Wi-Fi is the acronym of "Wireless Fidelity".

In DPP, partner apparatus selection by using a QR Code® and wireless communication techniques (for example, NFC and Bluetooth®) with comparatively short communicable ranges is being considered. In addition, in DPP, it is proposed that parameter exchange will be securely performed based on the public key of a partner apparatus that has been specified by a QR code or a wireless communication technique.

However, in DPP, there is a problem that it does not specifically define what kind of processing is to be performed when a wireless communication technique is to be used to select a partner apparatus. For example, NPL 1 does not describe a method of exchanging a public key with a partner apparatus specified by a wireless communication technique, and the parameter exchange method using a wireless communication technique proposed in DPP has room for improvement.

CITATION LIST

Non Patent Literature

NPL 1: Wi-Fi Alliance, Wi-Fi Device Provisioning Protocol (DPP) DRAFT Technical Specification v0.0.23

SUMMARY OF THE INVENTION

The present invention provides a more specific method of exchanging parameters for establishing a connection between desired apparatuses.

A communication apparatus according to an aspect of the present invention comprises a first communication unit; a second communication unit different from the first communication unit; a detection unit configured to detect, by using the first communication unit, a partner apparatus for parameter exchange processing performed by using the second communication unit to participate in a network; an exchanging unit configured to exchange information to be used in communication for the parameter exchange processing with the partner apparatus; and an execution unit configured to execute the parameter exchange processing using the information by using the second communication unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

An embodiment of the present invention will be described in detail hereinafter with reference to the accompanying drawings. Although an example using a wireless LAN system in compliance with IEEE802.11 standard series will be described below, the present invention is not limited to the following modes, and for example, the following argument may be applied to a wireless communication system that is not in compliance with the IEEE802.11 standard.

(Apparatus Arrangement)

Figure 1:
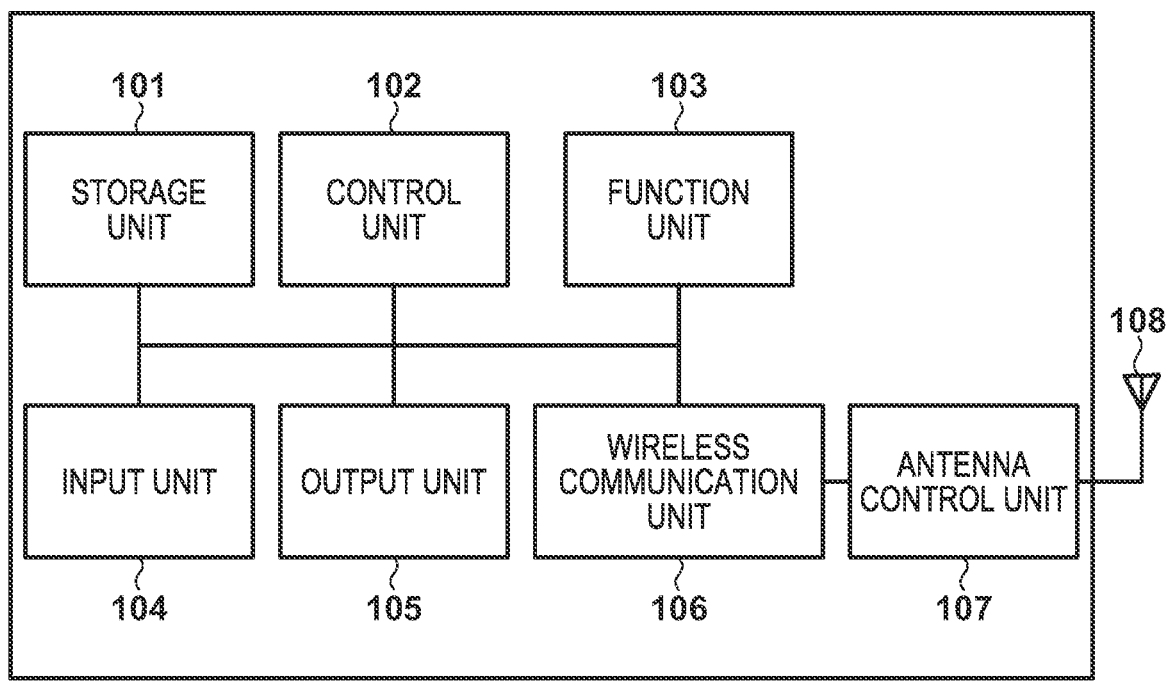
FIG. 1 is a block diagram showing an example of the hardware arrangement of a communication apparatus.

FIG. 1 shows an example of the hardware arrangement of a communication apparatus according to the embodiment. The communication apparatus includes, as an example of its hardware arrangement, a storage unit 101, a control unit 102, a function unit 103, an input unit 104, an output unit 105, a wireless communication unit 106, an antenna control unit 107, and an antenna 108.

The storage unit 101 is formed by both or one of a ROM and a RAM, and stores programs for executing various kinds of operations (to be described later) and various kinds of information such as communication parameters for wireless communication. Note that other than memories such as the ROM and the RAM, a storage medium such as a flexible disk, a hard disk, an optical disk, a magneto-optical disk, a CD-ROM, a CD-R, a magnetic tape, a nonvolatile memory card, a DVD or the like may be used as the storage unit 101.

The control unit 102 is formed by, for example, a processor such as a CPU, an MPU, or the like, an ASIC (application-specific integrated circuit), a DSP (digital signal processor), an FPGA (field programmable gate array), and the like. In this case, CPU and MPU are acronyms for Central Processing Unit and Micro Processing Unit, respectively. The control unit 102 executes programs stored in the storage unit 101 to control the overall communication apparatus. Note that it may be set so that the control unit 102 will control the overall communication apparatus by the cooperation of the programs stored in the storage unit 101 and an OS (Operating System). In addition, the control unit 102 can also perform communication parameter setting control with another apparatus. The control unit 102 can execute control programs stored in the storage unit 101 to perform the various kinds of operations (to be described later).

In addition, the control unit 102 controls the function unit 103 to execute predetermined processing such as image capturing, printing, image projection, and the like. The function unit 103 is hardware for the communication apparatus to execute predetermined processing. For example, in a case in which the communication apparatus is a camera, the function unit 103 will be an image capturing unit and perform image capturing processing. The communication apparatus according to this embodiment includes the function unit 103 that functions as an image capturing unit for capturing, for example, a QR code or the like. Also, for example, in a case in which the communication apparatus is a printer, the function unit 103 will be a printing unit and perform printing processing. Additionally, in a case in which the communication apparatus is a projector, the function unit 103 will be an image projection unit and perform image projection processing. The data processed by the function unit 103 may be data stored in the storage unit 101 or may be data obtained by communicating with another apparatus via the wireless communication unit 106 (to be described later).

The input unit 104 accepts various kinds of operations made by a user. The output unit 105 performs various kinds of outputs to the user. An output from the output unit 105 here includes, for example, one of an output of visually recognizable information such as an LCD and LED, an audio output by a loudspeaker, a vibration output, and the like. Although the output unit 105 can display a QR code in one example, the output unit 105 need not have the function of displaying a QR code and the QR code may be attached to the housing of the communication apparatus in the form of a sticker or the like. Note that it may be set so that both the input unit 104 and the output unit 105 are implemented by a single module such as a touch panel.

The wireless communication unit 106 controls wireless communication in compliance with IEEE802.11 standard series and controls IP communication. Note that the wireless communication unit 106 can also, for example, execute control related to wireless communication such as Near Field Communication (to be referred to as "NFC") and Bluetooth. The antenna control unit 107 can exchange wireless signals for wireless communication by controlling the antenna 108. The apparatus communicates content such as image data, document data, video data, and the like to another communication apparatus via the wireless communication unit 106. Note that it may be arranged so that separate communication circuits and antennas are installed for different standards or so that communication by a plurality of communication will be performed by a single circuit or a single antenna.

Figure 2:
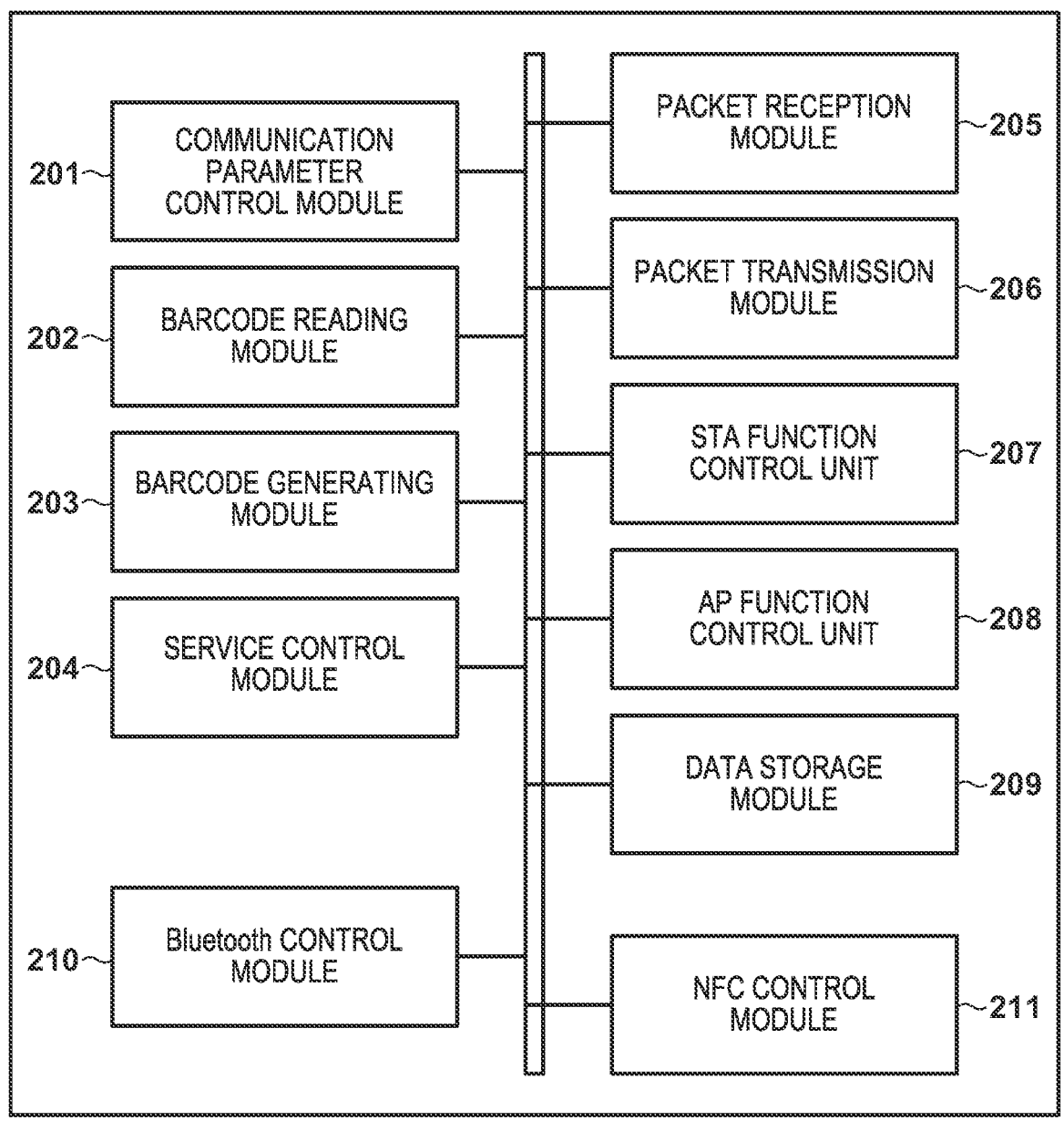
FIG. 2 is a block diagram showing an example of the functional arrangement of the communication apparatus.

FIG. 2 is a block diagram showing an example of software functions implemented by the control unit 102 of the communication apparatus reading out and executing the programs stored in the storage unit 101. Note that although it will be described here that each function is implemented by software, some or all of the software functional blocks shown in FIG. 2 may be implemented by hardware. Note that the hardware implementing some or all of the functions can be a dedicated circuit generated on a programmable processor such as an FPGA by using a predetermined complier from a program for implementing the functional blocks.

The communication apparatus includes, for example, a communication parameter control module 201, a barcode reading module 202, a barcode generating module 203, a service control module 204, a packet reception module 205, a packet transmission module 206, an STA function control module 207, a AP function control module 208, and a data storage module 209. The communication apparatus further includes a Bluetooth control module 210 and an NFC control module 211. Note that these functional blocks are arranged to be able to communicate with each other, supply its own output to another function, or perform processing by obtaining the output of another function.

The communication parameter control module 201 executes and controls communication parameter sharing processing for sharing communication parameters between apparatuses. In the communication parameter sharing processing, the providing apparatus provides communication parameters to a receiving apparatus so that wireless communication can be executed. In this case, the communication parameters can include, for example, at least one of an SSID (Service Set Identifier) as a network identifier, an encryption method, an encryption key, an authentication method, an authentication key, and the like. Also, a MAC (Medium Access Control) address as identification information unique to the communication apparatus, a passphrase, an IP address for executing communication in an IP layer, information necessary for upper layer service, and the like may be included in the communication parameter.

The barcode reading module 202 analyzes an image of a barcode, a two-dimensional code including a QR code, or the like captured by the function unit 103 and obtains encoded information. The barcode generating module 203 generates a barcode, a two-dimensional code, or the like and performs control to cause the output unit 105 to display the barcode, the two-dimensional code, or the like that has been generated. The service control module 204 performs processing in an application layer which is a service providing layer of an upper layer equal to Layer 5 or higher in the OSI reference model. That is, the service control module 204 uses wireless communication by the wireless communication unit 106 to execute processing such as print processing, image streaming processing, file transfer processing, and the like.

The packet reception module 205 and the packet transmission module 206 execute control on all packet transmission/reception operations including an upper-layer communication protocol. In addition, the packet reception module 205 and the packet transmission module 206 control the wireless communication unit 106 to perform packet reception and packet transmission, respectively, with a partner apparatus in compliance with the IEEE802.11 standard.

The STA function control module 207 provides an STA function for the apparatus to operate as a station (STA) in the infrastructure mode defined in the IEEE802.11 standard. The STA function control module 207 executes authentication and encryption processing and the like when the apparatus is to operate as an STA. Also, the AP function control module 208 provides an AP function for the apparatus to operate as an access point (AP) in the infrastructure mode defined in the IEEE802.11 standard. The AP function control module 208 forms a wireless network, executes authentication/encryption processing on the STA, and manages the STA. The data storage module 209 performs control to write, in the storage unit 101, or to read out, from the storage unit 101, software (program) for implementing at least some of the functions shown in FIG. 2, communication parameters, information such as a barcode, and the like.

The Bluetooth control module 210 performs packet transmission/reception, profile control, and the like based on the Bluetooth® standard. In the Bluetooth 4.2 standard (for example, Bluetooth Low Energy (BLE)), there are roles such as a peripheral apparatus that transmits an advertising signal and a central apparatus that receives the advertising signal. In the communication parameter sharing processing, if the service to be performed is a communication parameter providing service, the apparatus which is to provide the communication parameter will be the central apparatus that provides the service, and the apparatus which is to receive the communication parameter will be the peripheral apparatus that is to accept the service. On the other hand, if the service to be performed is a communication parameter receiving service, the apparatus which is to receive the communication parameter will be the central apparatus that provides the service, and the apparatus which is to provide the communication parameter will be the peripheral apparatus that is to accept the service. In one example, the Bluetooth control module 210 can operate as a central apparatus or a peripheral apparatus in accordance with its role and the service to be executed. The NFC control module 211 performs sequence and profile control based on the NFC standard.

In addition, note that the functional blocks described above are merely examples, and it may be arranged so that a plurality of functional blocks will form a single functional block or one of the functional blocks may further be divided into blocks that perform a plurality of functions. Furthermore, an additional function may be added or some of the functions may be omitted as needed.

(Network Arrangement)

Figure 3:
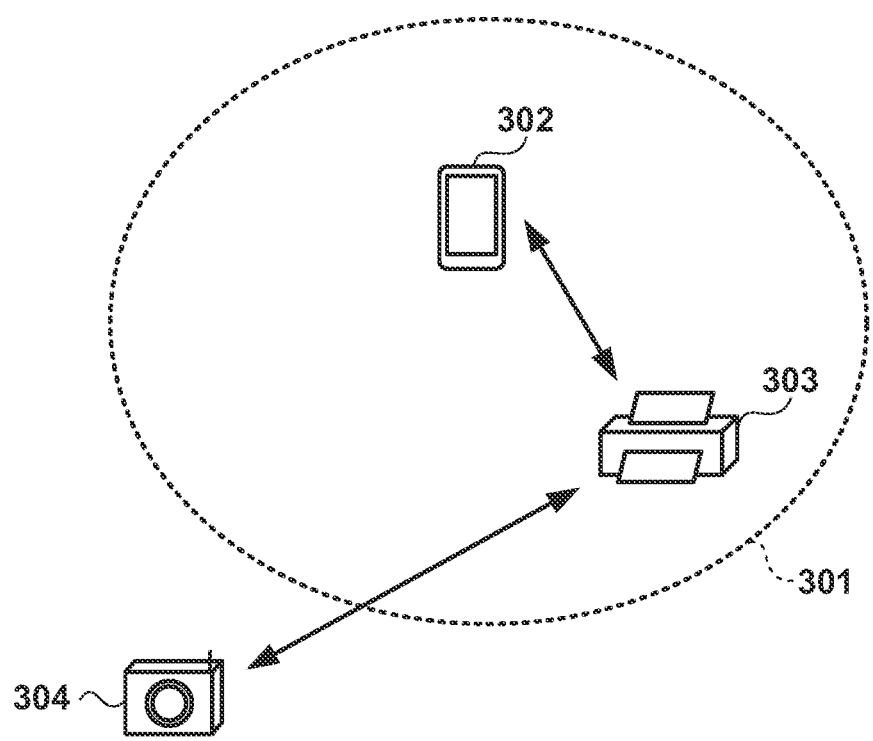
FIG. 3 is a view showing an example of a network arrangement.

FIG. 3 shows an example of the arrangement of a network 301 according to the embodiment. In this example, the network 301 is a wireless LAN formed by a printer 303 and in which a smartphone 302 participates. Assume that, in the following description, when a digital camera 304 is to participate in a network formed by the printer 303, the smartphone 302 will set the parameters for participating in the network 301 on the digital camera 304. Note that the smartphone 302 and the digital camera 304 are, for example, communication apparatuses that have the arrangements shown in FIGS. 1 and 2 described above.

(Processing Procedure)

A few examples of the procedure of parameter sharing processing concerning the network 301 which is executed between the smartphone 302 and the digital camera 304 when the digital camera 304 is to participate in the network 301 formed by the printer 303 will be described next.

Processing Example 1

In this processing example, the smartphone 302 and the digital camera 304 recognize each other by using a first communication function, and the digital camera 304 will subsequently use a second communication function to transmit the information to be used at the execution of the parameter sharing processing to the smartphone 302. Then, for example, the smartphone 302 will transmit the parameters concerning the network 301 to the digital camera 304 by using the second communication function or based on the received information to be used at the execution of parameter sharing. Note that although the information to be used at the execution of parameter sharing will be an encryption key in this case, it may be information other than the encryption key. Assume hereinafter that the first communication function is, for example, a communication function in compliance with the Bluetooth standard, and the second communication function is a communication function in compliance with the Wi-Fi communication standard. Note that the network 301 is a wireless LAN in compliance with the Wi-Fi communication standard, and the second communication function in this case is also a communication function used to participate in the network 301. However, although the digital camera 304 has the second communication function, it cannot participate in the network 301 until it receives the parameters from the smartphone 302. That is, the communication (communication of information to be used at the execution of parameter sharing processing and communication at the time of parameter sharing) using the second communication function performed between the smartphone 302 and the digital camera 304 described above is communication performed outside the network 301. Note that the communication of the information to be used at the execution of parameter sharing processing and communication at the time of parameter sharing may be performed by using different communication functions. For example, the communication at the time of parameter sharing may be performed by using a third communication function. In addition, the second communication function may differ from the communication function used to participate in the network. Furthermore, the communication using the second communication function may be in compliance with different standards (or different versions of a standard) when it is to be used in the network 301 and when it is to be used at the time of parameter sharing. For example, the communication at the time of parameter sharing may be in compliance with an old comparatively low-speed standard and the communication in the network 301 may be performed in compliance with a new high-speed standard.

First, an example of a case in which the smartphone 302 and the digital camera 304 notify each other of the capability information of the self-apparatus by using Bluetooth will be described hereinafter with reference to FIG. 4. Note that Bluetooth Low Energy (BLE) will be used in the communication performed by Bluetooth here. Although BLE has a low communication speed and the data amount that can be transmitted at once is small, it is a communication scheme with low power consumption.

In this processing, first, the user determines to start the communication parameter sharing processing on the smartphone 302, and selects a scheme to search for a partner apparatus (the digital camera 304 in this example). The partner apparatus search scheme can employ, for example, one of specifying a partner apparatus by a two-dimensional code including a QR code, recognizing a partner apparatus by NFC touch, and executing a partner apparatus search/specification processing by a close range wireless technique such as Bluetooth, Zigbee, or the like. In this case, assume that the user of the smartphone 302 has selected Bluetooth (BLE) as the partner apparatus determination scheme. The user inputs this selection result to the smartphone 302 by, for example, executing a predetermined operation in a predetermined application.

As a result, the smartphone 302 controls the Bluetooth control module 210 and operates as a peripheral apparatus under Bluetooth. The smartphone 302 transmits (for example, executes broadcast transmission) (F401) an advertising signal which includes information indicating that a communication parameter sharing service will be executed. The advertising signal includes information indicating the role of the smartphone 302 in the communication parameter sharing service, that is, information as to whether it will operate as a parameter providing apparatus or a parameter receiving apparatus. Since the smartphone 302 is to operate as the parameter providing apparatus here, information indicating this fact is included in the advertising signal and transmitted. The advertising signal can also include information such as the MAC address or the UUID (Universally Unique Identifier) of the smartphone 302 as the device identification information to be used in the wireless LAN after the handover.

On the other hand, assume that the user has also determined to start the communication parameter sharing processing in the digital camera 304 and that the user has selected Bluetooth (BLE) as the partner apparatus search scheme. The user can input this selection result to the digital camera 304 by, for example, executing a predetermined operation. As a result, the digital camera 304 controls the Bluetooth control module 210 and operates as a peripheral apparatus under Bluetooth. That is, in this example, the smartphone 302 and the digital camera 304 operate together as peripheral apparatuses.

The digital camera 304 receives the Bluetooth advertising signal transmitted by the smartphone 302 in F401. The digital camera 304 analyzes the contents of the received advertising signal and determines whether information indicating that the communication parameter sharing service will be executed is included. Also, the digital camera 304 determines whether the received advertising signal includes the information indicating that the transmission source (smartphone 302) of the advertising signal is a parameter providing apparatus. Since the digital camera 304 is scheduled to operate as a parameter receiving apparatus, it can ignore an advertising signal which includes information indicating that the transmission source is a parameter receiving apparatus. On the other hand, if it is determined that the advertising signal includes the information indicating that the transmission source apparatus is to execute the communication parameter sharing service as a parameter providing apparatus, the digital camera 304 can detect the transmission source apparatus as the partner apparatus of a communication parameter exchange service. Subsequently, upon detecting the partner apparatus (smartphone 302) of the communication parameter exchange service, the digital camera 304 generates a public key to be used in the communication for the communication parameter sharing processing. For example, the digital camera 304 makes an internal instruction (F402) to the communication parameter control module 201 to generate the public key to be used in the communication for the communication parameter sharing processing. The communication parameter control module 201 of the digital camera 304 generates (F403) the public key to be used in the communication for the communication parameter sharing processing in response to this instruction. Subsequently, the digital camera 304 controls the Bluetooth control module 210 to start operating as a peripheral apparatus under Bluetooth and transmits (F404) an advertising signal which includes the information indicating that the communication parameter sharing service is to be executed. As in the explanation related to the process of F401, the advertising signal includes information indicating the role of the digital camera 304 in the communication parameter sharing service, that is, information as to whether it will operate as a parameter providing apparatus or a parameter receiving apparatus. Since the digital camera 304 is to operate as a parameter receiving apparatus here, information indicating this fact is included in the advertising signal and transmitted. In addition, the advertising signal can also include information such as the MAC address or the UUID of the digital camera 304 as the device identification information to be used in the wireless LAN after the handover. The digital camera 304 will execute the handover from Bluetooth to the wireless LAN after the advertising signal has been transmitted.

On the other hand, upon receiving the advertising signal transmitted from the digital camera 304 in F404, the smartphone 302 analyzes the contents of the received advertising signal and determines whether information indicating that the communication parameter sharing service is to be executed is included. The smartphone 302 also determines whether the received advertising signal includes information indicating that the transmission source (digital camera 304) of the advertising signal is a parameter receiving apparatus. Since the smartphone 302 is scheduled to operate as a parameter providing apparatus, it can ignore an advertising signal which includes information indicating that the transmission source is a parameter providing apparatus. If it is determined that the advertising signal includes the information indicating that the transmission source apparatus is to execute the communication parameter sharing service as a parameter receiving apparatus, the smartphone 302 will determine that the apparatus which is the transmission source of the advertising signal in F404 is the partner apparatus to which the parameters are to be provided. Subsequently, the smartphone 302 makes an internal instruction (F405) to execute the handover from Bluetooth to the wireless LAN in accordance with this determination. At this point, the smartphone 302 as the parameter providing apparatus and the digital camera 304 as the parameter receiving apparatus will complete the handover to the wireless LAN together.

In this state, the smartphone 302 will transmit (F406) a signal to the digital camera 304 to request the public key to be used in the communication for communication parameter sharing processing via the wireless LAN. Upon receiving the request signal from the smartphone 302, the digital camera 304 returns (F407) a response signal including the public key generated in F403 to the smartphone 302. Upon receiving the public key, the smartphone 302 transmits (F408) an authentication request signal including hash values of information indicating the received public key to the digital camera 304. Upon receiving this authentication request signal, if authentication using the hash values included in the signal is successful, the digital camera 304 will transmit (F409) an authentication response signal indicating that the authentication has succeeded to the smartphone 302. Upon receiving the authentication response signal, the smartphone 302 transmits (F410) the authentication confirmation signal. The digital camera 304 will then transmit (F411) a setting request signal to the smartphone 302. Upon receiving the setting request signal, the smartphone 302 transmits (F412), to the digital camera 304, a setting response signal including pieces of information such as the SSID, passphrase, the channel of the wireless LAN, and the like in response to this setting request signal. Note that the transmission of data from the smartphone 302 to the digital camera 304 is performed by using the public key transmitted in F407.

In this manner, for example, partner apparatus detection in the communication parameter sharing processing is performed between communication apparatuses which are to perform parameter sharing by using the first communication function that allows communication over a comparatively short range. Subsequently, in response to this detection, information to be used in the communication for sharing wireless LAN parameters is transmitted/received between the communication apparatuses by using the second communication function different from the first communication function, and the wireless LAN parameters are shared based on the information. Performing apparatus detection by using the first communication function which has a short communicable range can reduce the probability that the communication parameters will be shared with an apparatus that is not the actual communication parameter sharing target. In addition, by using the first communication function to discover the partner apparatus and by using the second communication function to transmit/receive information such as the information of the public key or the like to be used in the communication for parameter sharing, the information can be transmitted/received reliably even in a case in which the first communication function can only transmit a small data amount.

Figure 5:
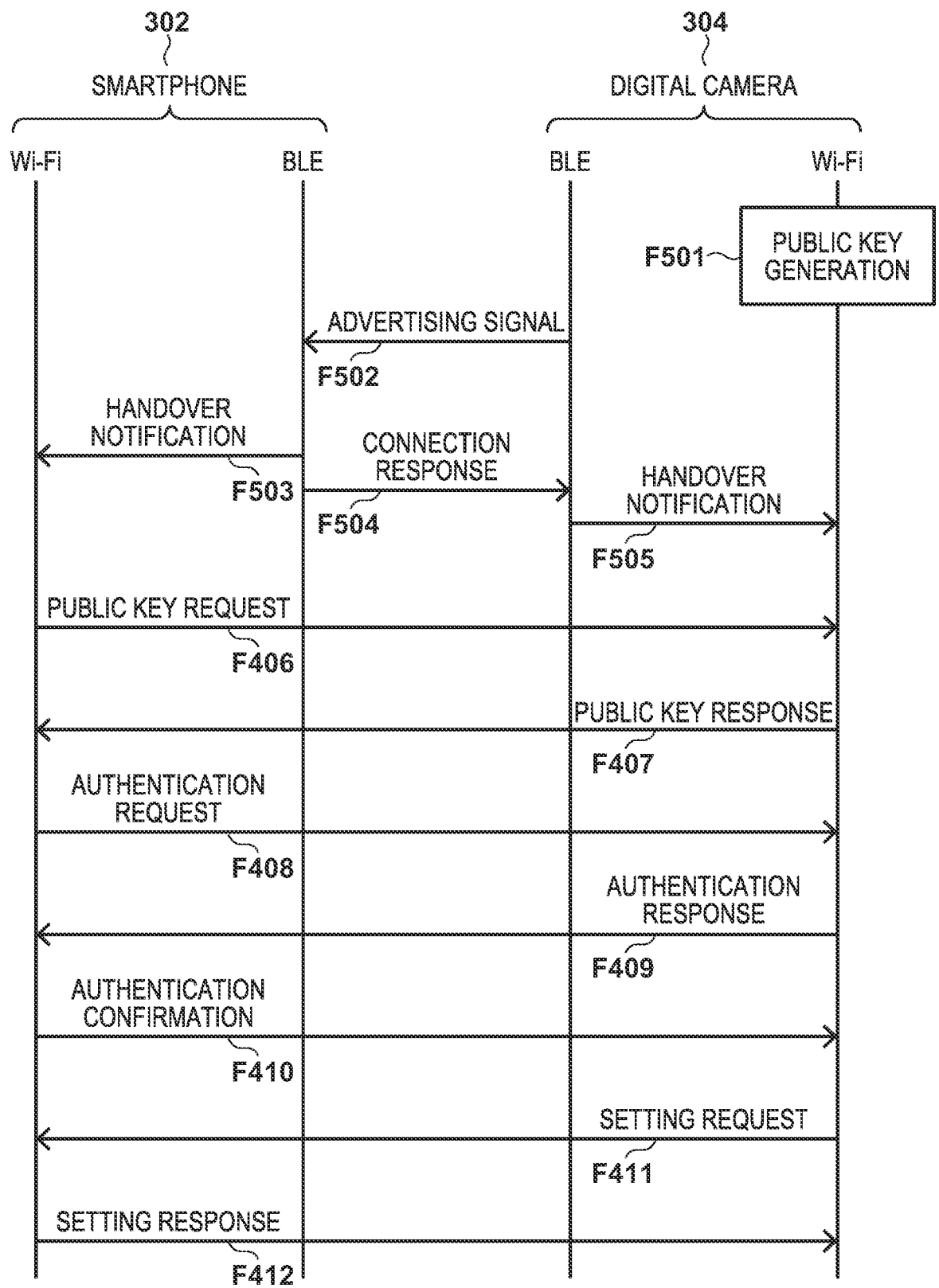
FIG. 5 is an operation sequence chart showing the second example of the procedure of processing between the communication apparatuses.

The same effect can be obtained by the processing shown in FIG. 5. FIG. 5 shows an example of the procedure of processing in a case in which the smartphone 302 makes a response based on the notification information transmitted from the digital camera 304. Assume that Bluetooth Low Energy (BLE) will be used in the communication by Bluetooth performed in this case.

First, in the smartphone 302, the user determines to start the communication parameter sharing processing and selects a partner apparatus search scheme. Assume here that the user of the smartphone 302 has selected Bluetooth as the partner apparatus determination scheme. The user inputs this selection result to the smartphone 302 by, for example, executing a predetermined operation on a predetermined application. The smartphone 302 controls the Bluetooth control module 210 and operates as a central apparatus under Bluetooth.

On the other hand, in the digital camera 304, assume also that the user has determined to start the communication parameter sharing processing and selected Bluetooth as the partner apparatus search scheme. The user can input this selection result to the digital camera 304 by, for example, executing a predetermined operation. After this selection, the digital camera 304 generates (F501) a public key to be used in the communication for the communication parameter sharing processing in the communication parameter control module 201.

Subsequently, the digital camera 304 controls the Bluetooth control module 210 and operates as a peripheral apparatus under Bluetooth. The digital camera 304 then transmits (F502) an advertising signal which includes information indicating that the communication parameter sharing service is to be executed. The advertising signal includes information indicating the role of the digital camera 304 in the communication parameter sharing service, that is, information indicating whether the digital camera is to operate as a parameter providing apparatus or a parameter receiving apparatus. Since the digital camera 304 is to operate as a parameter receiving apparatus here, information indicating this fact is included in the advertising signal and transmitted. In addition, the advertising signal stores information such as the MAC address or the UUID of the digital camera 304 as the device identification information to be used in the wireless LAN after the handover.

Upon receiving the advertising signal transmitted by the digital camera 304 in F502, the smartphone 302 analyzes the contents of the received advertising signal and determines whether information indicating that the communication parameter sharing service is to be executed is included. The smartphone 302 also determines whether the received advertising signal includes information indicating that the transmission source (digital camera 304) of this advertising signal is the parameter receiving apparatus. Since the smartphone 302 is scheduled to operate as the parameter providing apparatus, it can ignore an advertising signal which includes information indicating that the transmission source is a parameter providing apparatus. If it is determined that the advertising signal includes information indicating that the transmission source communication apparatus is to execute the communication parameter sharing service as a parameter receiving apparatus, the smartphone 302 makes an internal instruction (F503) to execute the handover from Bluetooth to the wireless LAN. The smartphone 302 also transmits (F504) a connection response signal to the digital camera 304 via Bluetooth. Note that the sequence of F502 and F504 is the same sequence as the standard specification sequence defined in the Bluetooth core specification. In addition, the connection response signal in F504 includes information indicating the role of the smartphone 302 in the communication parameter sharing service, that is, whether the smartphone operates as a parameter providing apparatus or a parameter receiving apparatus. Since the smartphone 302 operates as the parameter providing apparatus here, the information indicating this fact is included in the advertising signal and transmitted. This connection response signal can also include information such as the MAC address or the UUID of the smartphone 302 as the device identification information to be used in the wireless LAN after the handover. Note that the connection response signal may include the device identification information of the digital camera 304 included in the advertising signal received in the process of F502. Note that although it is assumed in this case that the smartphone 302 will transmit the connection response signal in accordance with the procedure of the processing defined by the Bluetooth core specification, the present invention is not limited to this. That is, it is sufficient for the smartphone 302 to be able to notify the digital camera 304 of the information indicating that the smartphone itself will execute the communication parameter sharing service as the parameter providing apparatus, and an arbitrary signal can be used to perform this notification.

When the connection response signal is received, the digital camera 304 makes an internal instruction (F505) to execute the handover from Bluetooth to the wireless LAN.

Figure 4:
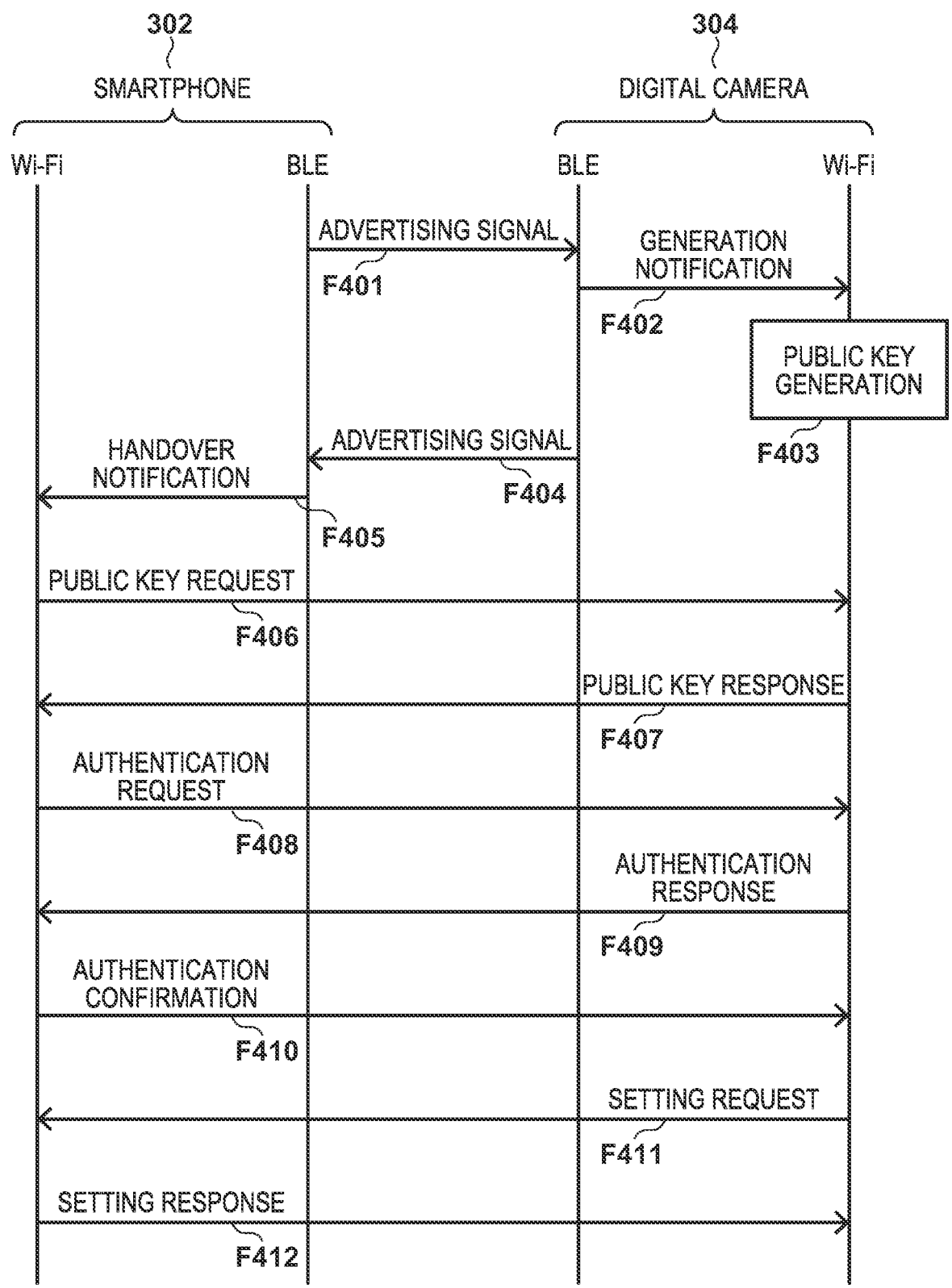
FIG. 4 is an operation sequence chart showing the first example of the procedure of processing between communication apparatuses.

Since subsequent processes are the same as those of F406 to F412 in FIG. 4, the same reference numerals will denote the same processes and a description will be omitted.

The procedure of processing executed by each of the smartphone 302 and the digital camera 304 will be described next.

Figure 6:
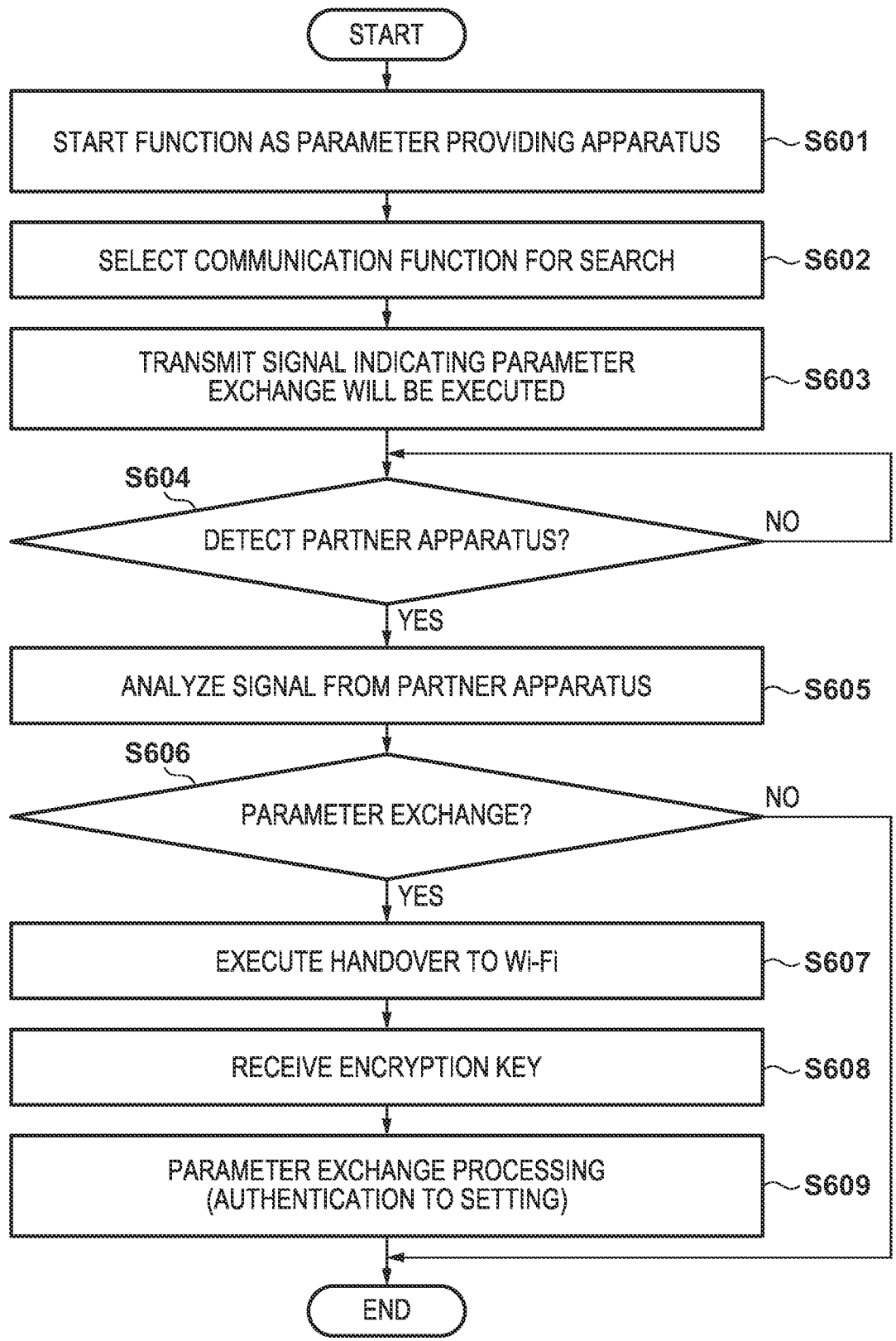
FIG. 6 is a flowchart showing the first example of the procedure of processing executed by a smartphone.

FIG. 6 is a flowchart showing an example of the procedure of provision processing of communication parameters or the like executed by the smartphone 302. Note that the processing of FIG. 6 is started by the control unit 102 in response to the acceptance of a user operation selecting the start of processing via the input unit 104 and the output unit 105. In addition, the processing of FIG. 6 is implemented by the control unit 102 reading out and executing a computer program stored in the storage unit 101.

First, for example, in response to the acceptance of the user operation, the smartphone 302 determines (step S601) to start the providing apparatus function of the communication parameter sharing processing. The smartphone 302 then selects (step S602) a partner apparatus search scheme. Assume here that the smartphone 302 has selected Bluetooth. In response to this selection, the smartphone 302 starts operating as a peripheral apparatus or a central apparatus. For example, the smartphone 302 will operate as a peripheral apparatus in a case in which processing as that of FIG. 4 is to be executed and will operate as a central apparatus in a case in which processing as that of FIG. 5 is to be executed.

When operating as a peripheral apparatus, the smartphone 302 transmits (step S603) an advertising signal which includes information indicating that it will execute the communication parameter sharing service as a parameter providing apparatus. Subsequently, after transmitting the advertising signal in step S603, the smartphone 302 stands by (step S604) to detect a partner apparatus (digital camera 304). Note that the smartphone 302 can detect the partner apparatus by the advertising signal transmitted from the partner apparatus. When the partner apparatus has been detected in step S604, the smartphone 302 analyzes (step S605) the contents of the received signal and determines (step S606) whether it includes information indicating that the partner apparatus is to execute the communication parameter sharing service as a parameter receiving apparatus. If it is determined that such information is included (YES in step S606), the smartphone 302 executes (step S607) the handover from Bluetooth to the wireless LAN. After the completion of the handover, the smartphone 302 transmits a request for the public key generated by the digital camera 304 and receives (step S608) the response signal including the public key. Subsequently, the smartphone 302 executes parameter exchange processing with the digital camera 304 by using the received public key, and provides (step S609) the communication parameters to the digital camera 304. Note that the process of step S609 corresponds to the process performed from F408 to F412 in FIGS. 4 and 5.

On the other hand, if the smartphone 302 determines that the received signal does not include the information indicating that the partner apparatus is to execute the communication parameter sharing service as a parameter receiving apparatus (NO in step S606), the processing ends. Note that if it is determined that the received signal does not include the information indicating that the partner apparatus is to execute the communication parameter sharing service as a parameter receiving apparatus (NO in step S606), it may be also set so that the process will return to step S604 and the smartphone 302 will stand by to detect another apparatus.

Note that when operating as a central apparatus, the smartphone 302 first detects the apparatus in response to receiving a signal from the partner apparatus and analyzes the signal. Then, in response to determining that this signal includes the information indicating that the partner apparatus is to execute the communication parameter sharing service as a parameter receiving apparatus, the smartphone 302 executes the handover from Bluetooth to the wireless LAN. The smartphone 302 also transmits a connection response signal to the digital camera 304. That is, when operating as the central apparatus, the smartphone 302 will execute the processes of steps S604 to S607 after the process of step S602 and subsequently execute the process of step S603. Note that either the process of step S603 or the process of step S607 can be performed before each other in the processing order in this case. In addition, the connection response signal here includes, as described above, information indicating that the smartphone is to execute the communication parameter sharing service as the parameter providing apparatus. The smartphone 302 can execute the processes of step S608 and S609 after the connection response signal has been transmitted.

Figure 7:
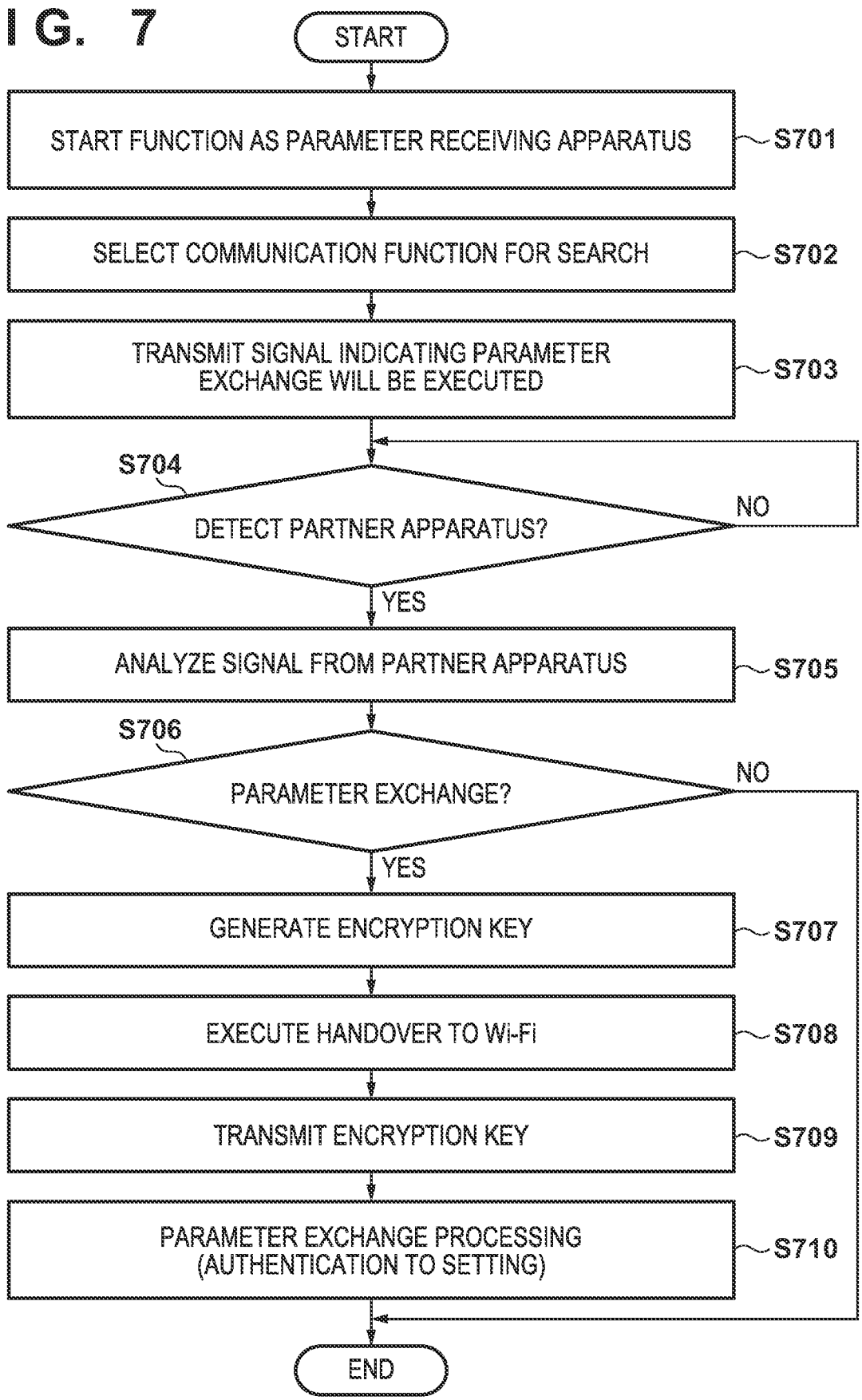
FIG. 7 is a flowchart showing the first example of the procedure of processing executed by a digital camera.

FIG. 7 is a flowchart showing an example of the procedure of reception processing such as the communication parameters or the like executed by the digital camera 304. Note that the processing of FIG. 7 can be started by the control unit 102 when the communication function of the wireless LAN is enabled at the powering-on of the digital camera 304. Note that the processing of FIG. 7 may also be started by the control unit 102 in response to the acceptance of a user operation selecting the start of the processing via the input unit 104 and the output unit 105. In addition, the processing of FIG. 7 is implemented by the control unit 102 reading out and executing a computer program stored in the storage unit 101.

First, for example, in response to the acceptance of the user operation, the digital camera 304 determines (step S701) to start the receiving apparatus function of the communication parameter sharing processing. The digital camera 304 then selects (step S702) a partner apparatus search scheme. Assume here that the digital camera 304 has selected Bluetooth. In response to this selection, the digital camera 304 starts operating as a peripheral apparatus. Note that it is set so that the digital camera 304 will operate always as a peripheral in this case. That is, even in a case in which the digital camera 304 is operating as a central apparatus, it will operate as a peripheral apparatus when the communication parameter sharing service is to be executed.

Subsequently, the digital camera 304 controls the Bluetooth control module 210 and transmits (step S703) an advertising signal including information indicating that it is to execute the communication parameter sharing service as a parameter receiving apparatus. After transmitting the advertising signal in step S703, the digital camera 304 stands by (step S704) until a partner apparatus (smartphone 302) is detected. Note that the digital camera 304 can detect the partner apparatus by the advertising signal or the connection response signal transmitted from the partner apparatus. When a partner apparatus is detected in step S704, the digital camera 304 analyzes (step S705) the contents of the received signal and determines (step S706) whether it includes information indicating that the partner apparatus is to execute the communication parameter sharing service as a parameter providing apparatus. If it is determined that such information is included (YES in step S706), the digital camera 304 generates (step S707) a public key (encryption key) necessary for the communication parameter sharing service. Subsequently, the digital camera 304 executes (step S708) handover from Bluetooth to the wireless LAN. Next, after the completion of the handover, the digital camera 304 transmits (step S709) a response signal including the public key generated in step S707 to the smartphone 302 as a response to the public key request signal from the smartphone 302. Subsequently, the digital camera 304 executes the parameter exchanging processing of F408 to F412 in FIGS. 4 and 5 and receives (step S710) the communication parameters from the smartphone 302. Note that if it is determined that the received information does not include information indicating that the partner apparatus is to execute the communication parameter sharing service as a parameter providing apparatus (NO in step S706), the digital camera 304 will end the processing. Note that if it is determined that the received signal does not include such information, the process may return to step S704, and the digital camera 304 may stand by to detect another apparatus.

Note that in the example described above, it has been described that the smartphone 302 as the parameter transmitting apparatus will operate as the central apparatus or the peripheral apparatus and the digital camera 304 as a parameter receiving apparatus will operate as the peripheral apparatus. However, the present invention is not limited to this. That is, it may be set so that the smartphone 302 will operate as the peripheral apparatus and the digital camera 304 will operate as the central apparatus. In any case, the smartphone 302 and the digital camera 304 will perform partner apparatus recognition by the first communication function such as Bluetooth and perform transmission/reception of information to be used in the processing to exchange parameters such as an encryption key and the like by the second communication function such as the wireless LAN. This can reduce the probability that the communication parameters will be shared with an apparatus which is not the actual communication parameter sharing target. In addition, by using the first communication function to discover the partner apparatus and by using the second communication function to transmit/receive information such as the information of the public key or the like to be used in the communication for parameter sharing, the information can be transmitted/received reliably even in a case in which the first communication function can only transmit a small data amount.

Processing Example 2

Figure 8:
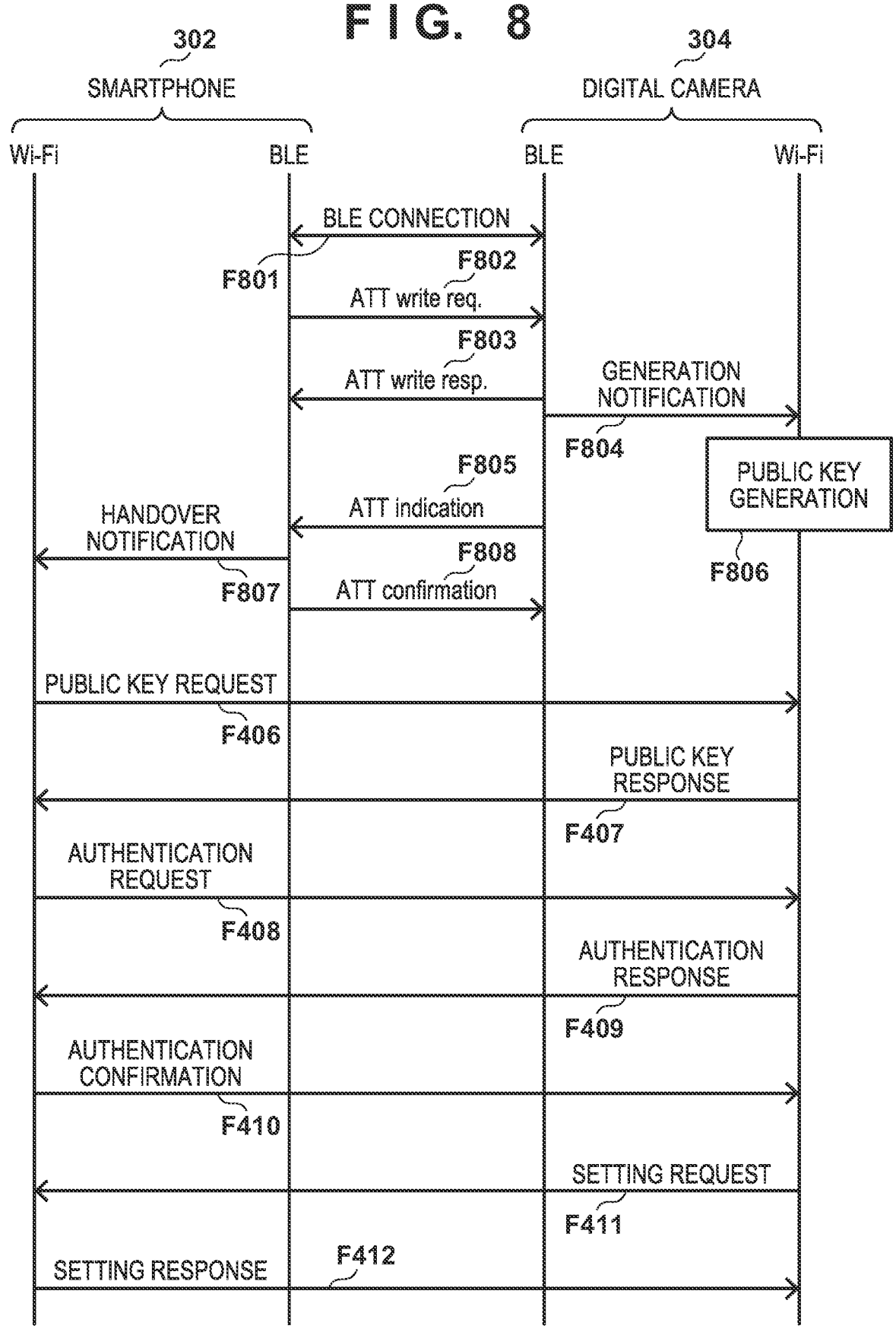
FIG. 8 is an operation sequence chart showing the third example of the procedure of processing between the communication apparatuses.

The above processing example 1 described an example of a case in which partner apparatus search is executed in a state in which the smartphone 302 and the digital camera 304 are in a state not connected by Bluetooth. In contrast, this processing example will describe a case in which connection by Bluetooth has already been established between the smartphone 302 and the digital camera 304. The procedure of this processing example is shown in FIG. 8.

In this processing example, assume that the smartphone 302 and the digital camera 304 are in a state (F801) in which connection has been established between them by Bluetooth (BLE) for the purpose of, for example, transmitting/receiving sensor information. Assume that the smartphone 302 and the digital camera 304 have determined to start the communication parameter sharing processing in this state by, for example, user operation.

The smartphone 302, operating as a Bluetooth client, transmits (F802) an ATT Write Request signal defined by Bluetooth TDS specification. Note that TDS is the acronym of Transport Discovery Service, and it is a method that allows a usable service to be discovered by using a communication function other than Bluetooth. After receiving the ATT Write Request signal, the digital camera 304, operating as a Bluetooth server, transmits (F803) an ATT Write Response signal which is a response signal to the received signal. Note that in parallel to or before or after the ATT Write Response signal has been transmitted, the digital camera 304 will instruct (F804) the communication parameter control module 201 to generate a public key necessary for the communication parameter sharing processing. The digital camera 304 will internally process the generation notification of F804 and generate (F806) the public key to be used in the communication for communication parameter sharing processing. When the public key has been generated, the digital camera 304 transmits (F805) an ATT Indication signal to the smartphone 302. Note that the digital camera 304 can transmit the ATT Indication signal in response to, for example, confirming that it is in a state in which communication can be performed by the wireless LAN, and the digital camera can subsequently execute processing to perform the handover from Bluetooth to the wireless LAN. Upon receiving the ATT Indication signal, the smartphone 302 will execute (F807) the processing to perform the handover from Bluetooth to the wireless LAN. After the completion of the handover processing, the smartphone 302 transmits (F808) an ATT Confirmation signal to the digital camera 304.

Since the preparation for executing processing via the wireless LAN is completed by the processing described above, the smartphone 302 and the digital camera 304 can execute the processing from the public key exchange to the sharing of communication parameters by using the wireless LAN. Note that since processes from the public key exchange to the sharing of communication parameters are the same as those of F406 to F412 of FIG. 4, the same reference numerals will denote the same processes and a detailed description will be omitted.

Figure 9:
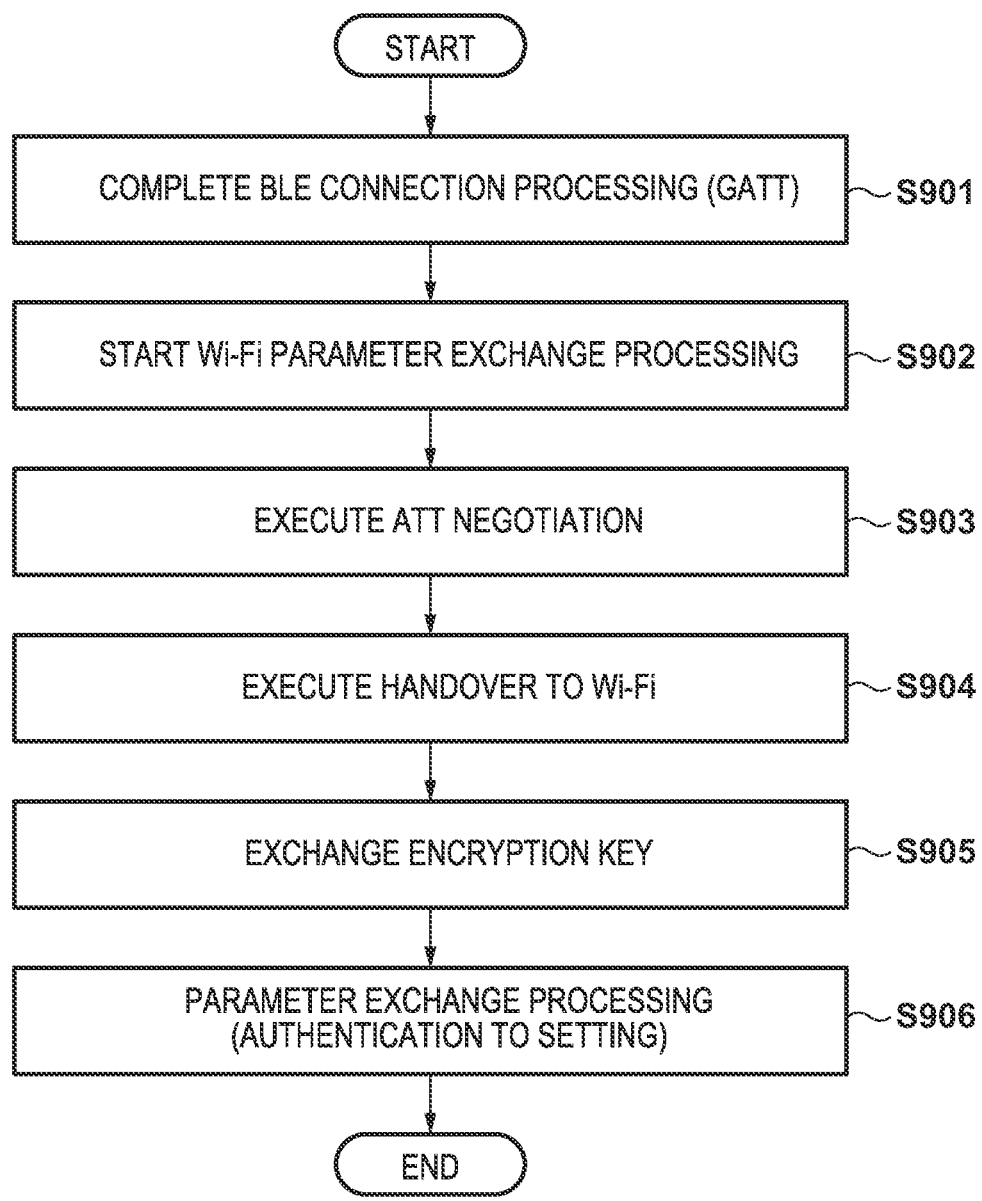
FIG. 9 is a flowchart showing the second example of the procedure of processing executed by the smartphone and the digital camera.

The procedure of processing executed by the smartphone 302 and the digital camera 304 will be described next with reference to FIG. 9. Note that the processing of FIG. 9 is started by the control unit 102 in response to the acceptance of a user operation selecting the start of processing via the input unit 104 and the output unit 105 of each of the smartphone 302 and the digital camera 304. The processing of FIG. 9 is also implemented by the control unit 102 reading out and executing a computer program stored in the storage unit 101.

First, assume that the smartphone 302 and the digital camera 304 are already connected via Bluetooth by using a GATT profile for transmitting/receiving sensor information to be used in IoT (Internet of Things) (step S901). Next, the smartphone 302 and the digital camera 304 determine (step S902) to start the communication parameter sharing processing upon, for example, accepting the user operation. The digital camera 304 and the smartphone 302 execute (step S903) ATT negotiation defined by the Bluetooth specification. This ATT negotiation refers to the sequence of processes from F802 to F805 and F808 in FIG. 8. Refer to the Bluetooth TDS specification for a more specific sequence. When communication parameter sharing is determined as a result of the ATT negotiation, the smartphone 302 and the digital camera 304 execute (step S904) the handover from Bluetooth to the wireless LAN. After the completion of the handover, the public key is transmitted form the digital camera 304 to the smartphone 302 (step S905). Subsequently, the parameter exchange processing is executed between the smartphone 302 and the digital camera 304

(step S906). The processing of step S906 corresponds to the processing described in relation to F408 to F412 of FIG. 4.

Although this processing example described an example in which the smartphone 302 operates as the Bluetooth client, and the digital camera 304 operates as the Bluetooth server (control point), the present invention is not limited to this. For example, the smartphone 302 may operate as the Bluetooth server (control point), and the digital camera 304 may operate as the Bluetooth client.

As described above, in this processing example, communication apparatuses that are already connected by Bluetooth can safely share communication parameters when executing handover to a wireless LAN communication function with higher communication traffic. At this time, since the smartphone 302 will provide parameters to digital camera 304 which is the partner apparatus to which it is connected by Bluetooth, the smartphone will not provide parameters to another apparatus to which it is not connected. Hence, this can reduce the probability that the communication parameters will be shared with an apparatus which is not the actual communication parameter sharing target. Note that a communication standard other than Bluetooth or wireless LAN can be used in this example as well. At this time, for example, the first communication function such as Bluetooth or the like can be a communication function that has a shorter communicable range than the second communication function such as the wireless LAN. In addition, although there may be a case in which, for example, the first communication function can transmit/receive only a small amount of data, information to be used in communication for sharing parameters such as public key information and the like may be transmitted/received by the second communication function so that the information can be reliably transmitted/received even in such a case.

Processing Example 3

Figure 10:
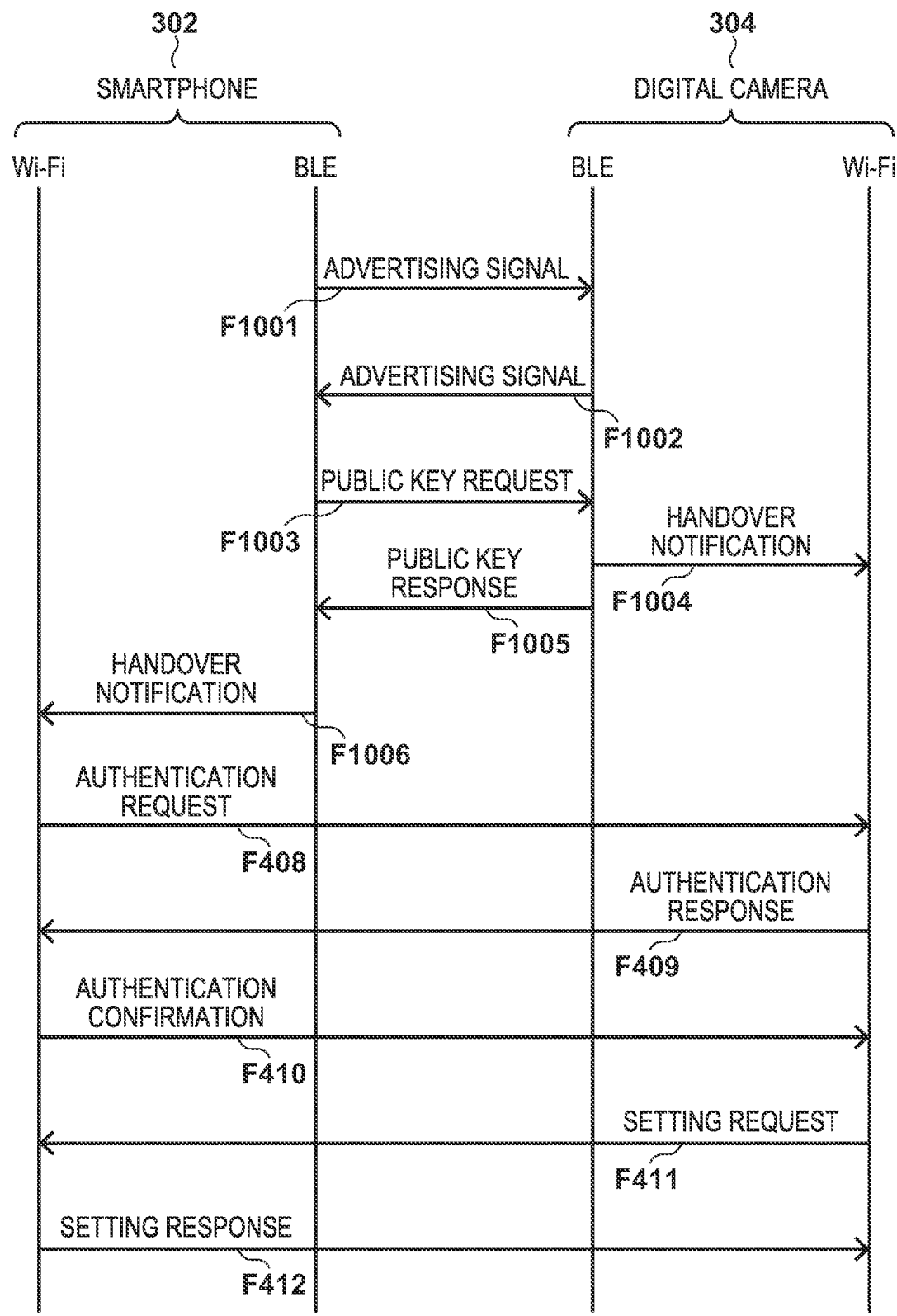
FIG. 10 is an operation sequence chart showing the fourth example of the procedure of processing between the communication apparatuses.

The above processing examples 1 and 2 described an example in which public key exchange is executed after the handover from Bluetooth to the wireless LAN. In contrast, this processing example will describe an example in which public key exchange is executed by Bluetooth. The procedure of this processing example is shown in FIG. 10.

In this processing, first, in the smartphone 302, the user determines to start the communication parameter sharing processing and selects a partner apparatus (the digital camera 304 in this example) search scheme. Assume here that the user of the smartphone 302 has selected Bluetooth (BLE) as the partner apparatus determination scheme. The user can input this selection result to the smartphone 302 by, for example, executing a predetermined operation on a predetermined application. As a result, the smartphone 302 controls the Bluetooth control module 210 and operates as a peripheral apparatus under Bluetooth. The smartphone 302 transmits (for example, executes broadcast transmission) (F1001) an advertising signal which includes information indicating that the communication parameter sharing service will be executed. The advertising signal includes information indicating the role of the smartphone 302 in the communication parameter sharing service, that is, information as to whether it will operate as a parameter providing apparatus or a parameter receiving apparatus. Since the smartphone 302 is to operate as the parameter providing apparatus here, information indicating this fact is included in the advertising signal and transmitted. The advertising signal can also include information such as the MAC address or the UUID (Universally Unique Identifier) of the smartphone 302 as the device identification information to be used in the wireless LAN after the handover.

On the other hand, assume that the user has also determined to start the communication parameter sharing processing in the digital camera 304 and that the user has selected Bluetooth (BLE) as the partner apparatus search scheme. The user can input this selection result to the digital camera 304 by, for example, executing a predetermined operation. As a result, the digital camera 304 controls the Bluetooth control module 210 and operates as a peripheral apparatus under Bluetooth. That is, in this example, the smartphone 302 and the digital camera 304 operate together as peripheral apparatuses. The digital camera 304 transmits (F1002) an advertising signal which includes information indicating that the communication parameter sharing service is to be executed. As in the explanation related to the process of F1001, the advertising signal includes information indicating the role of the digital camera 304 in the communication parameter sharing service, that is, information as to whether it will operate as a parameter providing apparatus or a parameter receiving apparatus. Since the digital camera 304 is to operate as the parameter receiving apparatus here, information indicating this fact is included in the advertising signal and transmitted. The advertising signal can also include information such as the MAC address or the UUID of the digital camera 304 as the device identification information to be used in the wireless LAN after the handover.

Note that although it has been described in the above description that the smartphone 302 and the digital camera 304 are to operate together as peripheral apparatuses, one of the smartphone 302 and the digital camera 304 may operate as, for example, a central apparatus. In this case, the apparatus that is to operate as the central apparatus can transmit, as a response to the advertising signal, a connection response signal as that of F504 in FIG. 5 to the apparatus operating as the peripheral apparatus.

Upon receiving the advertising signal of F1002, the smartphone 302 analyzes the contents of this advertising signal and determines whether information indicating that the communication parameter sharing service will be executed is included. If it is determined that the advertising signal includes the information indicating that the communication parameter sharing service is to be executed, the smartphone 302 transmits (F1003) a signal to make a request for a public key to be used in the communication for the communication parameter sharing to the digital camera 304. Upon receiving the public key request signal from the smartphone 302, the digital camera 304 returns (F1005) a response signal including the generated public key to the smartphone 302. Note that in parallel to or before or after the transmission of the response signal, the digital camera 304 will generate an internal instruction for executing the handover to the wireless LAN and execute (F1004) the handover from Bluetooth to the wireless LAN. When the response signal including the public key is received, the smartphone 302 executes (F1006) the handover from Bluetooth to the wireless LAN and starts the communication by the wireless LAN. Subsequently, the same processes as those of F408 to F412 in FIG. 4 are executed.

Figure 11:
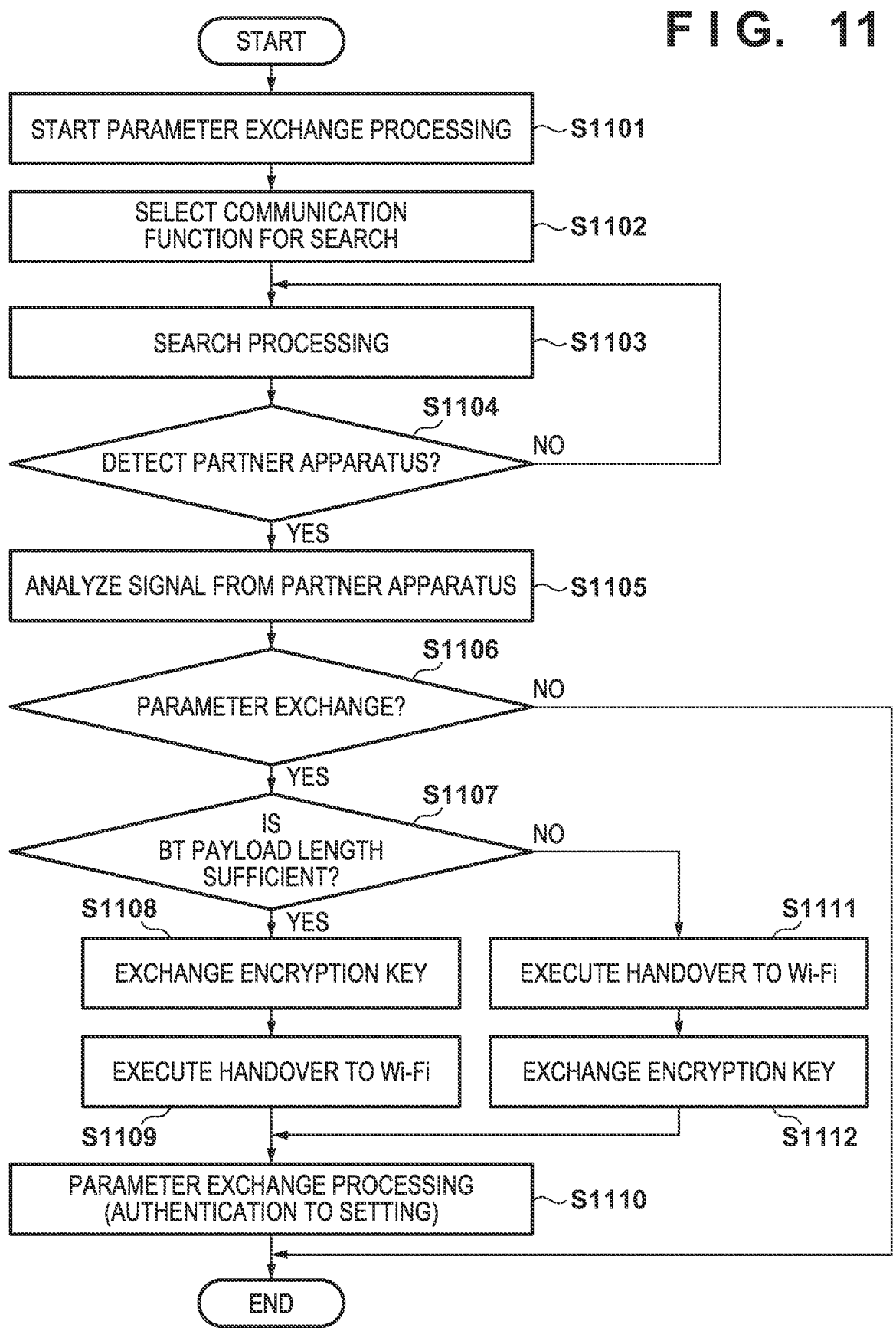
FIG. 11 is a flowchart showing the third example of the procedure of processing executed by the smartphone and the digital camera.

FIG. 11 is a flowchart showing an example of the procedure of processing executed by the smartphone 302 and the digital camera 304. Note that the processing of FIG. 11 can be started by the control unit 102 when the communication function of the wireless LAN is enabled at the powering-on of the smartphone 302 or the digital camera 304. Note that the processing of FIG. 11 may be started by the control unit 102 in response to the acceptance of a user operation selecting the start of processing via the input unit 104 and the output unit 105. The processing of FIG. 11 may also be implemented by the control unit 102 reading out and executing a computer program stored in the storage unit 101.

First, for example, in response to the acceptance of the user operation, the smartphone 302 or the digital camera 304 determines (step S1101) to start the communication parameter sharing processing. The smartphone 302 or the digital camera 304 then selects (step S1102) a partner apparatus search scheme. Assume here that the smartphone 302 or the digital camera 304 has selected Bluetooth. In response to this selection, the smartphone 302 or the digital camera 304 executes (step S1103) a partner apparatus search by Bluetooth. Note that the search processing in this case is performed in the same manner as in, for example, the processing example 1 described above.

The smartphone 302 or the digital camera 304 stands by (step S1104) to detect a partner apparatus. When a partner apparatus is detected by receiving a signal from the partner apparatus (YES in step S1104), the smartphone or the digital camera analyzes (step S1105) the contents of the received signal. The smartphone 302 or the digital camera 304 determines (step S1106) whether the received signal includes information indicating that the communication parameter sharing service is to be executed. If it is determined that the received signal includes such information (YES in step S1106), the smartphone 302 or the digital camera 304 confirms (step S1107) the payload length transmittable by a Bluetooth packet which it uses. In this case, the smartphone 302 or the digital camera 304 determines whether the transmittable payload length is sufficiently longer than the data length of the information, such as the public key or the like, used in the communication for the communication parameter setting described above. If it is determined that the payload length is sufficiently long (YES in step S1107), the smartphone 302 or the digital camera 304 will exchange (step S1108) the public key (encryption key) used in the communication for the communication parameter sharing service. Subsequently, the smartphone 302 or the digital camera 304 will execute (step S1109) the handover from Bluetooth to the wireless LAN and execute (step S1110) the parameter exchange processing described above in relation to the processes of F408 to F412 after the completion of the handover. On the other hand, if it is determined that the payload length is insufficient (NO in step S1107), the smartphone 302 or the digital camera 304 will first execute (step S1111) the handover from Bluetooth to the wireless LAN. Then, the smartphone 302 or the digital camera 304 exchanges (step S1112) the public key (encryption key) to be used in the communication for the communication parameter sharing service by the wireless LAN. Subsequently, the smartphone 302 or the digital camera 304 will execute (step S1110) the parameter exchange processing described above in relation to the processes of F408 to F412 after the completion of the handover.

Note that the confirmation of the payload length in step S1107 can be performed by including the information of the maximum payload size in the packet and referring to this information. In addition, for example, the confirmation in step S1107 may be performed based on the version information of the Bluetooth used in the smartphone 302 and the digital camera 304 by confirming whether the version information is a predetermined value. For example, if the version of the Bluetooth used in the smartphone 302 and the digital camera 304 belongs to a predetermined version or later, it can be determined that the payload length is sufficiently long.

In this manner, in this processing example, the smartphone 302 and the digital camera 304 recognize the partner apparatus by using the first communication function such as Bluetooth or the like and also transmits/receives information used in the parameter exchange processing such as the encryption key or the like by using the first communication function if possible. The smartphone 302 and the digital camera 304 subsequently use the information such as the encryption key or the like to exchange the wireless LAN parameters by executing the parameter exchange processing. This can reduce the probability that the communication parameters will be shared with an apparatus which is not the actual communication parameter sharing target.

In any of the processing examples described above, the detection of a communication parameter sharing processing partner apparatus is performed between communication apparatuses, which are to perform parameter sharing, by using the first communication function that allows communication over a comparatively short range. Subsequently, information (for example, an encryption key) used in the communication for sharing the wireless LAN parameters is transmitted/received between the detected communication apparatuses, and the wireless LAN parameters are shared by communication using this information. By performing apparatus detection by using the first communication function which has a short communicable range, it is possible to reduce the probability that information (for example, the encryption key) for sharing communication parameters will be shared with an apparatus which is not the actual communication parameter sharing target. Note that as long as detection can be performed between apparatuses which are to perform the parameter sharing, the first communication function need not be the Bluetooth communication function, and another communication function such as, for example, NFC or the like may be used. As described above, even in a case in which Bluetooth is used as described above, the connection need not always be established. Hence, an arbitrary function capable of outputting a signal indicating that the parameter sharing processing is to be executed can be used as the first communication function. In addition, the second communication function need not always be a communication function based on Wi-Fi, and a wireless LAN communication function in compliance with another standard or a communication function other than the wireless LAN may be used as the second communication function.

Note that only one of the processing examples described above may be constantly used or an apparatus capable of using a plurality of the processing examples may switch between the examples in accordance with the situation.

The present invention is not limited to the above-described embodiments, and various changes and modifications can be made within the spirit and scope of the present invention. Therefore, to apprise the public of the scope of the present invention, the following claims are made.

According to the present invention, parameters for establishing a connection between desired apparatuses can be exchanged.

Other features and advantages of the present invention will become apparent from the description provided hereinafter with reference to the accompanying drawings. Note that the same reference numerals denote the same or similar components in the accompanying drawings.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus, comprising:
   one or more memories storing instructions; and
   one or more processors executing the instructions causing the communication apparatus to:
   perform first wireless communication compliant with a Bluetooth standard;
   perform second wireless communication different from the first wireless communication;
   detect, by using the first wireless communication, a partner apparatus with which sharing processing for sharing a communication parameter used for joining a network is to be performed, wherein the partner apparatus joins the network formed by another apparatus;
   obtain, from the partner apparatus detected, a public key by using the second wireless communication;
   execute authentication processing with the partner apparatus by transmitting an authentication request including a hash value of the public key obtained, receiving an authentication response that indicates a result of authentication based on the public key, and transmitting an authentication confirmation signal in response to receiving the authentication response; and
   execute, in a case where the authentication processing succeeds, the sharing processing with the partner apparatus.

2. The communication apparatus according to claim 1, wherein the sharing processing is processing based on Wi-Fi Device Provisioning Protocol (DPP).

3. The communication apparatus according to claim 1, wherein the communication apparatus detects, using a predetermined signal of the first wireless communication, the partner apparatus, and wherein in a case where the predetermined signal includes predetermined information, an apparatus that has transmitted the predetermined signal is detected as the partner apparatus.

4. The communication apparatus according to claim 1, wherein the communication apparatus detects, using a predetermined signal of the first wireless communication, the partner apparatus, and wherein in a case where the predetermined signal includes information indicating that a transmitter apparatus of the predetermined signal is an apparatus for providing the communication parameter, the transmitter apparatus is detected as the partner apparatus.

5. The communication apparatus according to claim 1, wherein identification information of the partner apparatus in the second communication is obtained by the first wireless communication.

6. The communication apparatus according to claim 1, wherein a MAC address of the partner apparatus is obtained by the first wireless communication.

7. The communication apparatus according to claim 1, wherein handover processing is performed in response to performing the first wireless communication.

8. The communication apparatus according to claim 1, wherein the second communication is communication using wireless LAN.

9. The communication apparatus according to claim 1, wherein in the sharing processing for sharing the communication parameter, the communication parameter to be shared is encrypted using the public key.

10. A control method performed by a communication apparatus capable of performing first wireless communication compliant with a Bluetooth standard and second wireless communication different from the first wireless communication, the method comprising:
    detecting, by using the first wireless communication, a partner apparatus with which sharing processing for sharing a communication parameter used for joining a network is to be performed, wherein the partner apparatus joins the network formed by another apparatus;
    obtaining, from the partner apparatus detected, a public key by using the second wireless communication;
    executing authentication processing with the partner apparatus by transmitting an authentication request including a hash value of the public key obtained, receiving an authentication response that indicates a result of authentication based on the public key, and transmitting an authentication confirmation signal in response to receiving the authentication response; and
    executing, in a case where the authentication processing succeeds, the sharing processing with the partner apparatus.

11. A non-transitory computer-readable storage medium that stores a program for causing a computer, which is included in a communication apparatus capable of performing first wireless communication compliant with a Bluetooth standard and second wireless communication different from the first wireless communication, to:
    detect, by using the first wireless communication, a partner apparatus with which sharing processing for sharing a communication parameter used for joining a network is to be performed, wherein the partner apparatus joins the network formed by another apparatus;
    obtain, from the partner apparatus detected, a public key by using the second wireless communication;
    execute authentication processing with the partner apparatus by transmitting an authentication request including a hash value of the public key obtained, receiving an authentication response that indicates a result of authentication based on the public key, and transmitting an authentication confirmation signal in response to receiving the authentication response; and execute, in a case where the authentication processing succeeds, the sharing processing with the partner apparatus.

* * * * *